United States Patent [19]
Rohweder

[11] Patent Number: 5,819,427
[45] Date of Patent: Oct. 13, 1998

[54] CARPENTER'S PULL-APART FRAMING SQUARE

[76] Inventor: Barry L. Rohweder, 1401 Texas Ave. South, Minneapolis, Minn. 55426

[21] Appl. No.: 819,571

[22] Filed: Mar. 14, 1997

[51] Int. Cl.[6] ...................................................... B43L 7/027
[52] U.S. Cl. ............................................... 33/478; 33/474
[58] Field of Search ............................. 33/478, 474, 475, 33/809, 376

[56] References Cited

U.S. PATENT DOCUMENTS

| | | |
|---|---|---|
| 481,637 | 8/1892 | Poole . |
| 556,840 | 3/1896 | Biggs . |
| 607,101 | 7/1898 | Warnock . |
| 647,921 | 4/1900 | Hutchinson . |
| 710,509 | 10/1902 | Phillips . |
| 747,850 | 12/1903 | Rihlman .................................... 33/376 |
| 846,248 | 3/1907 | Schmalz . |
| 1,021,850 | 4/1912 | Shakely . |
| 1,205,946 | 11/1916 | Lyons ........................................ 33/376 |
| 1,235,956 | 8/1917 | Berkebile ................................. 33/376 |
| 1,276,565 | 8/1918 | Paschall ................................... 33/376 |
| 1,514,180 | 11/1924 | Spitler . |
| 1,549,151 | 8/1925 | Rasmussen . |
| 1,552,371 | 9/1925 | Williams .................................. 33/376 |
| 2,228,501 | 1/1941 | Bialkowski ............................. 33/478 |
| 2,379,048 | 6/1945 | Thomas . |
| 4,327,501 | 5/1982 | Hurt . |
| 4,653,194 | 3/1987 | Kim . |
| 4,745,689 | 5/1988 | Hiltz . |

*Primary Examiner*—Thomas B. Will
*Attorney, Agent, or Firm*—Haugen and Nikolai, P.A.

[57] ABSTRACT

A carpenter's square that can have the arms thereof separated for ease of storage and joined together during use includes a over-center latch arrangement designed to be no thicker than the thickness dimension of the arm members and which, when operated, tightly clamps the arms of the square at right angles to one another. A first arm of the square has an opening formed through the thickness dimension thereof along with alignment bores extending inwardly from a side edge thereof on either side of the opening. The second arm includes the over-center latch pivotally mounted in a slot or channel and includes a latch plate pivotally joined to a coupling member having a head thereon designed to fit within the opening on the first arm member. When the latch plate is manually actuated so as to reside within the slot of the second arm, the head on the coupling member cooperates with an edge defined by the opening in the first arm to tightly clamp the first and second arms one to the other.

10 Claims, 2 Drawing Sheets

CARPENTER'S PULL-APART FRAMING SQUARE

BACKGROUND OF THE INVENTION

I. Field of the Invention

This invention relates generally to workmen's tools, and more particularly to a carpenter's square having separate arm members that can be rigidly joined to one another for use, but which can readily be separated for ease of storage in a tool box.

II. Discussion of the Prior Art

The prior art is replete with examples of carpenter's squares having separable or folding arms for ease of carrying, but for the most part, they suffer from a number of different drawbacks, not the least of which is the inability to quickly and rigidly join and separate the tool arms of the square without resort to additional tools. When it is recognized that one arm of a typical carpenter's square may be as long as 22½ inches and the other 16 inches, any play in the joint between the two arms can translate into a relatively large possible angular deviation from perpendicular at the end of the arm opposite the joint.

For example, U.S. Pat. No. 481,637 to Poole describes an arrangement where the arms of the square are undercut at their junction and screws are used to fasten the arms together. This arrangement requires a screwdriver to fasten the two arms together and unless the screws are tightened down snugly, there is an opportunity for play in the joint.

U.S. Pat. No. 556,840 to Biggs describes a carpenter's square in which one blade thereof has a terminal portion adapted to fit into a dove-tail groove formed in the other arm. Unless the tongue and groove arrangement is formed with very tight tolerances, the resulting play will result in a significant deviation of the opposite end of one arm from the perpendicular. Moreover, in use, wear in the tongue and groove joint will compound the problem.

U.S. Pat. No. 846,248 to Schmalz shows a tongue 3 which is inserted in a groove defined by arms 6 and 7 for interlocking. Screws 14 and 15 are then employed to more rigidly affix the halves of the square to one another.

U.S. Pat. No. 1,549,151 to Rasmussen discloses a square arrangement where the arms join along a diagonal, the two arms being undercut at the joint so that each arm is of half the thickness of the remaining portion of the arms in the location of the joint. A rack and pinion gear arrangement cooperating with a slide plate 11 is provided for holding the two parts together. A hook-like end on the slide plate fits into a slot formed in the adjacent arm and the slide plate bridges the joint. Again, a screwdriver must be used to rotate the pinion to first create a snug coupling and later used to release the two arms. Any play in the rack and pinion gear arrangement necessarily results in undue play between the mating arms of the square.

SUMMARY OF THE INVENTION

It is accordingly a principal object of the present invention to provide a separable carpenter's square having first and second arms that can be readily coupled and uncoupled without the use of any extra tools and which will provide a rigid joint between the two arms so as to prevent any play therebetween which can translate into inaccurate alignment of work pieces that are intended to meet at a right angle.

The separable carpenter's square in accordance with the present invention comprises a first elongated rectangular arm member having a pair of alignment bores formed in an edge surface thereof and an opening formed through a thickness dimension thereof intermediate the pair of alignment bores. A second elongated rectangular arm member is provided with a pair of alignment protuberances that project outwardly from an edge surface thereof and which are adapted to be received in the alignment bores of the first arm member. The second arm member also has an elongated notch formed inwardly between the alignment protuberances. A latch means is pivotally mounted in the elongated notch in the second arm member and cooperates with the opening of the first arm member for releasibly clamping the first and second arm members to one another. The latch means comprises a latch plate that is pivotally connected to the second arm member within the elongated notch. A coupling member is pivotally joined to the latch plate at one end thereof and has a head member affixed to the coupling member. The head member is adapted to fit within the opening formed in the first arm member such that rotation of the latch plate in a first direction forces the first and second arm members tightly together along the edge surface thereof carrying the alignment bores and alignment protuberances, respectively. By providing a threaded connection between the coupling member and the head member, it is possible to adjust the clamping force being applied to ensure a snug fit.

DESCRIPTION OF THE DRAWINGS

The foregoing features, objects and advantages of the invention will become apparent to those skilled in the art from the following detailed description of a preferred embodiment, wherein like numerals in the several views refer to corresponding parts.

DESCRIPTION OF THE PREFERRED EMBODIMENT

Figure 1:
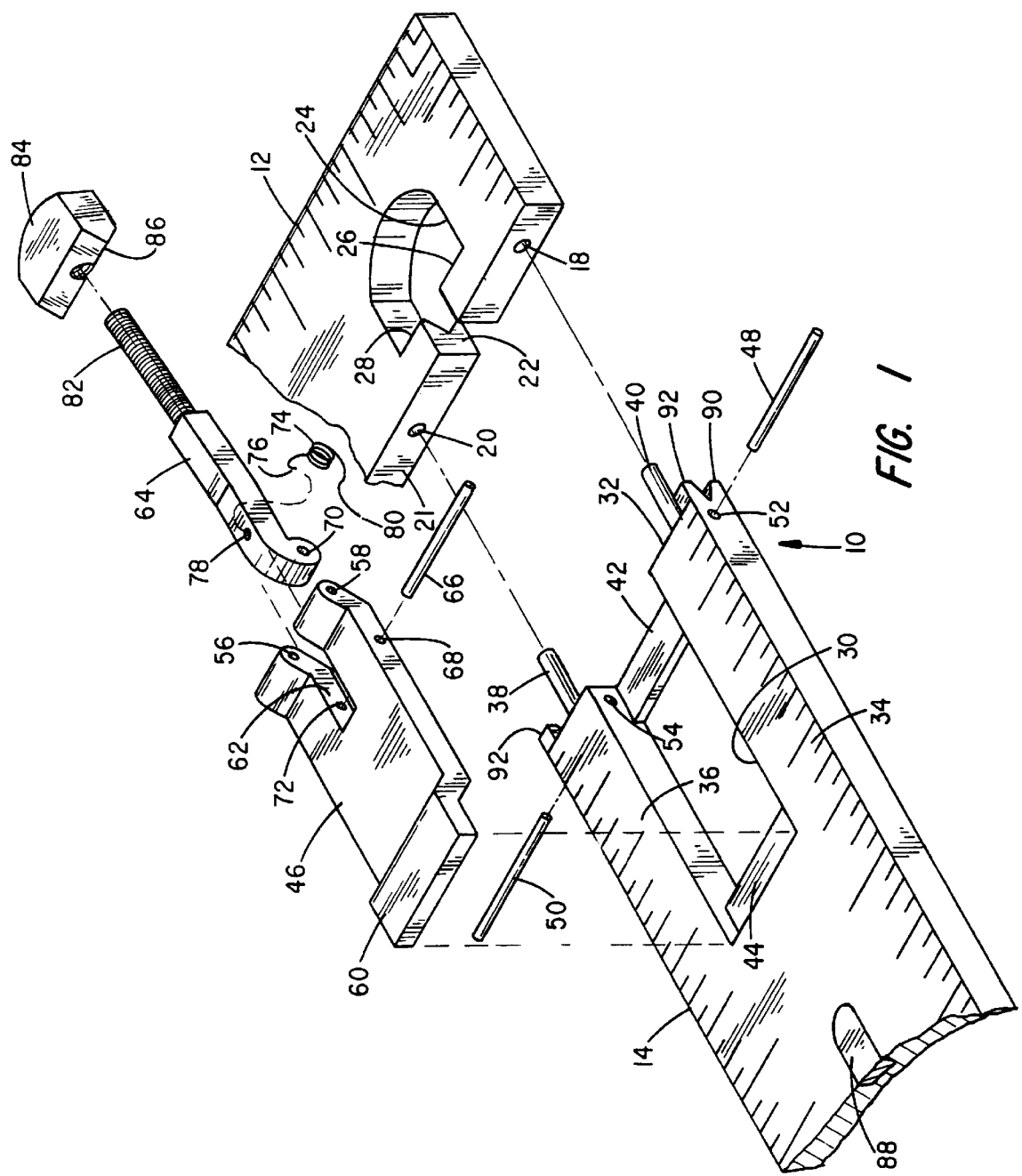
FIG. 1 is an exploded perspective view of the separable carpenter's square constructed in accordance with the present invention.

As used in the following description, the terms "horizontal", "vertical", "left", "right", "up" and "down" as well as adjectival and adverbial derivatives thereof (e.g., "horizontally", "rightwardly", "upwardly", etc.), simply refer to the orientation of the illustrated structure as the drawing figure faces the reader. Similarly, the terms "inwardly" and "outwardly" generally refer to the orientation of a surface relative to its access of elongation, or access of rotation, as appropriate.

Referring now to the drawing, this invention broadly provides an improved carpenter's square that can be separated into multiple components of generally equal size for ease of carrying in a toolbox and that can be readily rigidly joined to one another for use without any need to resort to the use of other tools to effect the intercoupling thereof.

With reference to the drawings, there is indicated generally by numeral 10, the carpenter's square comprising a preferred embodiment of the present invention. It is seen to comprise first and second elongated, rigid, rectangular arm members 12 and 14 in FIG. 1 and arm members 12, 14 and 16 in FIG. 2. The longer arm 14 may be 22½ inches in length and have a width of 2 inches. The shorter arm 12 may typically be 16 inches in length and 1½ inches wide. The arm members may be fabricated from metal or plastic and have conventional measuring indicia scribed along the longitudinal edges of the upper and lower major surfaces thereof.

A first edge surface of arm member 12, i.e., the side edge 21, includes a pair of spaced-apart, generally circular alignment bores 18 and 20 formed inwardly thereof. Formed midway therebetween is a slot 22 that extends through the thickness dimension of the arm 12 and leads to an enlarged opening 24. The edges 26 and 28 of the opening are inwardly beveled to form a V-shaped groove therein.

The arm member 14 has an elongated notch or channel 30 centrally disposed and extending inwardly from an end edge 32 thereof. The notch 30 defines first and second parallel legs 34 and 36 and extending outwardly from the end edge 32 of these legs are alignment protuberances 38 and 40 which may comprise cylindrical pins in other shapes. The protuberances 38 and 40 are dimensioned to fit with a close tolerance within the alignment bores 18 and 20 formed inwardly of a side edge surface 21 of arm member 12.

With reference again to FIG. 1, disposed within the slot 30 of the arm member 14 are front and rear transversely extending stop members 42 and 44. Inserted into the opening defined between the stop members 42 and 44 is a latch plate 46 that is pivotally mounted for rotation between the legs 34 and 36 by means of hinge pins 48 and 50 that are arranged to pass through transversely-extending, aligned bores 52 and 54 formed through the legs and into aligned bores 56 and 58 in the latch plate 46. The pins and bores may be partially threaded for ease of replacement should they become worn during prolonged use.

The latch plate 46 has an offset segment 60 that cooperates with the stop 44 when it is hinged to the arm member 14 by means of the pins 48 and 50. The latch plate 46 further includes a longitudinal slot 62 formed through it along its midline. The slot is dimensioned to receive a first end of a coupling member 64 therein, the coupling member being pivotally secured in the slot 62 by means of a hinge pin 66 that passes through aligned bores 68, 70 and 72 when the coupling member 64 is inserted into the slot 62. A coil spring, as at 74, has a first end 76 thereof inserted into a recess 78 formed atop the coupling member 64 and with the other end 80 thereof engaging the top surface of the latch plate 46. The spring 74 serves to prevent the coupling member 64 from pivoting freely and biases the coupling member 64 against the stop 42.

The coupling member 64 includes a threaded stud 82 on which is threaded a head member 84. The bore in the head member into which the stud 82 is treaded preferably includes a plastic or rubber bushing (not shown) to resist inadvertent rotation of the head member on the stud. As best seen in the plan view of FIG. 2, the head member 84 is dimensioned to fit within the opening 24 in arm member 12 with the threaded stud 82 fitting into the slot 22 in the arm member 12. The head member 84 has a V-shaped bevel 86 for cooperating with the V-shaped groove formed in the edges 26 and 28 of the opening 24. Looking at the mating end 32 of the arm 14, each of the legs 34 and 36 defining the slot 30 has a pair of pedestal-like projections 90 and 92 whose upper surfaces are formed so as to be coplanar. They cooperate with the edge surface 21 of arm 12 to insure a flat firm contact between the two arms.

OPERATION

With the arm 12 separated from the arm 14, to rigidly join the two arms together, the user first lifts the offset portion 60 of the latch plate 46, causing the latch plate to pivot about its hinge pins 48 and 50 and thereby displacing the head member 84 a greater distance from the end edge 32 of arm 14. The user then simultaneously aligns the protuberances 38 and 40 with the alignment bores 18 and 20 of arm member 12 while positioning the head member 84 into the opening 24. Now, by pressing down on the offset portion 60 of the latch plate, the latch plate is again pivoted about its hinge pins 48 and 50 which draws the coupling member 64 and the beveled edge of the head member 84 affixed to it into tight engagement with the V-shaped notched edges 26 and 28 of the opening 24. When the offset portion 60 is pressed against the stop 44, the over-center nature of the latch comes into play to maintain the pair of pedestals 90 and 92 on the edge surface 21 of arm member 12 in tight, flush, coplanar engagement with the end edge surface 32 of arm member 14. The clamping force is adjustable by virtue of the threaded engagement between the coupling member 64 and the head 84.

When the two arm members 12 and 14 are rigidly joined and held together by the clamping arrangement, all parts of the clamping arrangement lie between the upper and lower major surfaces of the arm members 12 and 14 so that the square will lay flush against a flat surface, allowing the carpenter to use the square for scribing lines on sheet material without rocking of the square.

Figure 2:
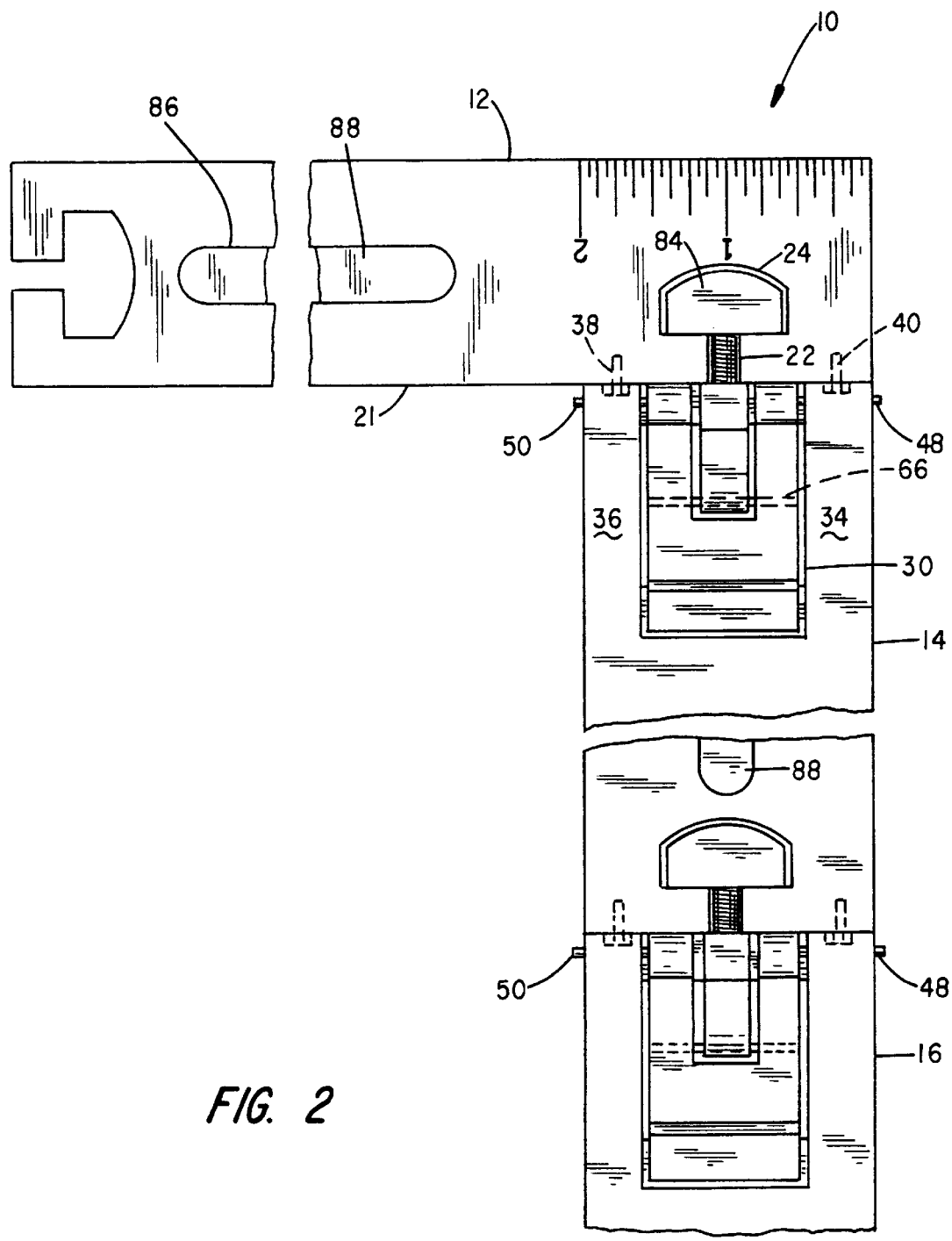
FIG. 2 is a top plan view of the carpenter's square of the present invention with the arm members thereof in clamped engagement.

As is illustrated in FIG. 2, either of the arms may themselves be segmented with the individual segments being joined together using the clamping arrangement heretofore described. See the manner in which arm segment 16 is joined to arm member 14.

Those skilled in the art can appreciate that the same coupling approach can be used in joining cooperating arms of a T-square by merely locating the opening 24 and the alignment bores 18 and 20 midway along the top arm of the T-square rather than at one end as shown in FIGS. 1 and 2. For convenience in storing the components of the square, an elongated recess 86 is formed centrally in each major surface of each of the arm segments 12, 14, 16, etc. Affixed in these recesses are strips of flexible magnetic rubber 88. When the segments are stacked atop one another, they are held together by magnetic attraction and tend not to be misplaced nor become separated in the carpenter's tool box.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A separable carpenter's square comprising:
   (a) a first elongated rectangular arm member having a pair of alignment bores formed in an edge surface thereof and an opening formed through a thickness dimension thereof intermediate the pair of alignment bores;
   (b) a second elongated rectangular arm member having a pair of alignment protuberances projecting outwardly from an edge surface thereof and adapted to be received in the alignment bores of the first arm member, the second arm member having an elongated notch formed inwardly between the alignment protuberances; and
   (c) latch means pivotally mounted in the elongated notch of the second arm member and cooperating with the opening of the first arm member for releasibly clamping the first and second arm members to one another.

2. The separable carpenter's square of claim 1 wherein the latch means comprises a latch plate pivotally connected to the second arm member in the elongated notch, a coupling member pivotally joined to the latch plate and a head member affixed to the coupling member and adapted to fit within the opening formed in the first arm member, rotation of the latch plate in a first direction forcing the first and second arm members tightly along the edge surfaces thereof.

3. The separable carpenter's square of claim 2 wherein the head member is threaded onto the coupling member.

4. The separably carpenter's square of claim 2 and further including a spring operatively coupled between the latch plate and the coupling member for urging the coupling member against a transversely extending stop disposed in the elongated notch.

5. A carpenter's square comprising:
   (a) a first arm member having first and second major rectangular surfaces with peripheral side and end edges of a predetermined thickness dimension extending between the first and second major surfaces,
      (i) first and second spaced apart bores extending inwardly from one side edge midway between the first and second major surfaces;
      (ii) a relatively narrow slot disposed midway between the first and second spaced apart bores and extending inwardly from the one side edge, the narrow slot leading to an enlarged opening formed through thickness dimension of the first arm;
   (b) a second arm member having first and second major rectangular surfaces with peripheral side and end edges of a thickness dimension equal to the predetermined thickness of the first arm member extending between the first and second major rectangular surfaces,
      (i) a rectangular slot formed inwardly from one end edge of the second arm member;
      (ii) first and second protuberances projecting outwardly from the one end edge on opposite sides of the rectangular slot, the spacing between the first and second protuberances being the same as a spacing between the spaced apart bores on the first arm member with the first and second protuberances adapted to be inserted into the first and second bores; and
   (c) an over-center latch assembly pivotally secured in the rectangular slot in the second arm member, the latch assembly including,
      (i) latch lever pivotally mounted in the rectangular slot in the second arm member,
      (ii) a coupling member pivotally coupled at one end thereof to the latch lever and having a head member secured to a second end of the coupling member,
      (iii) the coupling member dimensioned to pass through the relatively narrow slot in the first arm member with the head member disposed in the enlarged opening found in the first arm member.

6. The carpenter's square as in claim 5 wherein the second end of the coupling member is threaded for receiving the head member thereon.

7. The carpenter's square of claim 5 wherein the latch lever is of a thickness that is no greater than the predetermined thickness of the first and second arm member whereby the latch lever does not protrude beyond the first and second major surfaces of the first and second arm members.

8. The carpenter's square of claim 7 and further including stop means in the rectangular slot for engaging the latch lever and precluding over-rotation thereof in either a clockwise or a counter-clockwise direction.

9. The carpenter's square of claim 7 wherein the head member has tapered edge surfaces for self-centering relative to the narrow slot in the first arm member.

10. The carpenter's square as in claim 5 where the one end edge of the second arm member includes a plurality of pedestals formed thereon with top surfaces of said plurality of pedestals being coplanar.

* * * * *